US010996341B2

(12) United States Patent
Musella

(10) Patent No.: US 10,996,341 B2
(45) Date of Patent: May 4, 2021

(54) GNSS RECEIVER WITH PSEUDO-RANDOM NOISE CODE GENERATOR MODULE

(71) Applicant: STMicroelectronics S.r.l., Agrate Brianza (IT)

(72) Inventor: Gennaro Musella, Cornaredo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 226 days.

(21) Appl. No.: 16/200,936

(22) Filed: Nov. 27, 2018

(65) Prior Publication Data
US 2019/0162859 A1 May 30, 2019

(30) Foreign Application Priority Data

Nov. 29, 2017 (IT) .......................... 102017000137556

(51) Int. Cl.
*G01S 19/33* (2010.01)
*H04B 1/7085* (2011.01)
*G01S 19/37* (2010.01)
*H04J 13/12* (2011.01)
*G01S 19/30* (2010.01)
*G01S 19/32* (2010.01)

(52) U.S. Cl.
CPC .............. *G01S 19/33* (2013.01); *G01S 19/37* (2013.01); *H04B 1/7085* (2013.01); *H04J 13/12* (2013.01); *G01S 19/30* (2013.01); *G01S 19/32* (2013.01); *H04B 2201/7073* (2013.01)

(58) Field of Classification Search
CPC .......... G01S 19/33; G01S 19/37; G01S 19/36; G01S 19/25; G01S 19/243; H04B 1/7085; H04J 13/12
USPC .................................................... 342/357.73
See application file for complete search history.

(56) References Cited

U.S. PATENT DOCUMENTS

2017/0108588 A1* 4/2017 Wei ...................... H04B 1/7105
2018/0356531 A1* 12/2018 Naveen ................... G01S 19/37

FOREIGN PATENT DOCUMENTS

| CN | 102073053 A | 5/2011 |
| CN | 102571254 A | 7/2012 |
| JP | 2004201005 A | 7/2004 |

* cited by examiner

*Primary Examiner* — Harry K Liu
(74) *Attorney, Agent, or Firm* — Slater Matsil, LLP

(57) ABSTRACT

A Pseudo-Random Noise code generator module is configured to generate PRN codes operating with different navigation standards for use with a GNSS receiver. The generator includes a number of linear shift registers including a respective number of feedback taps and a channel selection network including an output multiplexer. A first register includes a first number of taps and a second register includes a second number of taps. The first register and second register are associated with a respective feedback network to combine signals at the feedback taps to obtain a feedback signal that is selectably fed back through a selection circuit at an input of the respective register. A network can selectably concatenate the first register with the second register.

20 Claims, 5 Drawing Sheets

GNSS RECEIVER WITH PSEUDO-RANDOM NOISE CODE GENERATOR MODULE

CROSS-REFERENCE TO RELATED APPLICATIONS

This application claims priority to Italian Patent Application No. 102017000137556, filed on Nov. 29, 2017, which application is hereby incorporated herein by reference.

TECHNICAL FIELD

The present description relates to a GNSS receiver comprising a Pseudo-Random Noise code generator module.

BACKGROUND

A GNSS (Global Navigation Satellite System) receiver determines the user position, velocity, and precise time (PVT) by processing the signals broadcast by satellites. Since satellites are always in motion, the receiver has to continuously acquire and track the signals from the satellites in view, in order to compute an uninterrupted solution, as desired in most applications. Any navigation solution provided by a GNSS receiver is based on the computation of its distance to a set of satellites, by means of extracting the propagation time dt of the incoming signals travelling through space at the speed of light, according to the satellite and receiver local clocks. This time difference is transformed into a fake range, the "pseudo-range" R, by multiplying it by the speed of the light in the vacuum. The pseudo-range R might be seen as a very rough estimate of the true range between satellite and user, and has to be corrected to account for a number of phenomena before it can be interpreted as a precise measurement of the true distance.

Most of the Global Navigation Satellite Systems use Code Division Multiple Access (CDMA) techniques to multiplex several satellite signals onto the same frequency. The basic concept behind the CDMA schemes is that each satellite is assigned with a Pseudo-Random Noise (PRN) code that modulates the transmitted signal. The use of these PRN codes spreads the signal over the spectrum, making it look like noise. Furthermore, the PRN codes have properties such that their autocorrelation function is at a maximum when they are completely aligned. GNSS receivers have prior knowledge of each satellite's PRN code (e.g., through the relevant SIS ICD (Signal In Space Interface Control Document), and correlate the incoming signals with local code replicas, to determine if a given satellite is visible or not.

FIG. 1, to this regards, schematically shows a satellite receiver 10, receiving a satellite signal S from a satellite SV. The satellite receiver 10 comprises a RF section 11, which performs a frequency down conversion, amplification and analog to digital conversion obtaining a digital intermediate frequency IF. The GNSS receiver 10 includes then an acquisition module 12 which receives the digital intermediate frequency IF and is configured to identify the satellite SV sending satellite signal S correlating such incoming satellite signal S with a locally generated PRN code sequence, which is generated specifically in the PRN generator 121 for all possible PRN codes and covering a certain range of frequency Doppler due to the satellite and receiver movement. After the acquisition, a tracker module 13, which includes one or more PRN generators 131 keeps the satellite SV continuously and accurately tracked. In general the tracker module 13 includes a plurality of tracking channels, and in any tracking channel the incoming satellite signal S is correlated with a locally generated PRN code with the correct phase and Doppler frequency—information which is coming from the acquisition side. The demodulated data are then supplied to a software navigation module 14 which provides position, velocity and time estimates PVT.

As just discussed, a PRN generator is an essential block in a GNSS receiver. In the last decade several navigation system have been developed by different countries, such as Global Positioning System (GPS), Global'naya Navigatsionnaya Sputnikovaya Sistema (GLONASS), Galileo System, or other types of satellite-based positioning systems, and each one requires its particular PRN generator. They must be supported in a receiver that wants to be a GNSS receiver. Considering the system to be supported, the classic, faster but not efficient solution, as shown schematically in FIG. 2, is to implement a separate PRN generator for each navigation system, shown by their tracing channel $13_1 \ldots 13_6$, which supplies the required PRN code PC (shown as function of time alongside the clock signal CK) on input channels C1 . . . C6 of a multiplexer 15, and then multiplex it according to a control signal PRS received by the multiplexer 15. However the number of tracking channel in a GNSS receiver is greatly increased (up to 96 or more) in order to improve the performances and support new system. Thus, supporting the solution shown in FIG. 2 for each tracking channel is expensive.

SUMMARY

Embodiments of the invention relate to a GNSS receiver comprising a Pseudo-Random Noise code generator module configured to generate Pseudo-Random Noise codes operating with different navigation standards, The generator comprises a plurality of linear shift registers including a respective plurality of feedback taps and a channel selection network including an output multiplexer and corresponding Pseudo-Random Noise code generation method.

Various embodiments may apply to GNSS receivers with satellite multi band capability, e.g., one or more among GPS L1, GPS L2C, GPS L5, BEIDOU, GLONASS, and GALILEO E5. Various embodiments may apply to GNSS receivers for automotive positioning applications.

Various embodiments provide GNSS receiver comprising a Pseudo-Random Noise code generator that solves drawbacks of the prior art. For example, embodiments require only one Pseudo-Random Noise code generator for each tracking channel.

One or more embodiments may refer to a corresponding method as well as to a computer program product that can be loaded into the memory of at least one computer and comprises parts of software code that are able to execute the steps of the method when the product is run on at least one computer. As used herein, reference to such a computer program product is understood as being equivalent to reference to a computer-readable means containing instructions for controlling the processing system in order to co-ordinate implementation of the method according to the embodiments. Reference to "at least one computer" is evidently intended to highlight the possibility of the present embodiments being implemented in modular and/or distributed form.

According to an example solution described herein, a GNSS receiver comprises a Pseudo-Random Noise code generator module configured to generate PRN codes operating with different navigation standards. The generator comprises a plurality of linear shift registers including a respective plurality of feedback taps and a channel selection network including an output multiplexer. The generator includes a first register with a determined number of taps and a second register with a same number of taps. The first register and second register are associated with a respective feedback network to combine signals at the feedback taps to obtain a feedback signal fed back at the input of the respective register. A network is configured to selectably concatenate the first register with the second register.

In variant embodiments, the generator includes a first register with a determined number of taps and a second register with a same number of taps.

In variant embodiments, the network to selectably concatenate the first register with the second register is configured to generate concatenation signals, including a first concatenation signal from at least a tap of the first register to an input of the selection circuit at an input of the of the second register and a second concatenation signal from at least a tap of the second register or of the first register to an input of the selection circuit at an input of the first register. The selection circuit is arranged on the input of each register and configured to select between the feedback signal and the concatenation signal.

In variant embodiments, the feedback network includes a register for storing a feedback mask to select the feedback taps.

In variant embodiments, on one or more taps of each register is arranged a selector circuit connected also to the concatenation signal, selecting between the tap signal and a combination, in particular a XOR operation, between the tap signal and the concatenation signal.

In variant embodiments, the channel selection network includes a plurality of selection devices, in particular, multiplexer to select signals of given taps of the registers and combination operators, in particular XOR operator, to combine the selected signals to form channels of PRN codes to be selected by the output multiplexer under the control of a selection system signal generated by an external processor.

In variant embodiments, the channel selection network includes a circuit for selecting the tap signals of the first and second register by a respective forward mask and to combine the selected signals of one register with the selected signals with the other to obtain an input signal for the output multiplex, the second input corresponding to the second concatenation signal taken from a multiplexer selecting among the signals originated by taps of the first and second register, to be selected by the output multiplexer under the control of a selection system signal generated by an external processor.

In variant embodiments, the first and second register include fourteen taps, and the first concatenation signal is taken from the last tap of the first register while the second concatenation signal is taken from the penultimate tap of the second register.

In variant embodiments, the first and second register include 16 taps, and in that the first concatenation signal is taken from the last tap of the first register while the second concatenation signal is taken from a multiplexer selecting among the signals originated by taps of the first and second register.

In variant embodiments, the receiver includes a processor configured to access a register map containing initial values of the registers and the masks and the PRN code to be generated, the register map containing a system select information to generate programming signals through a dedicated logic circuit for the generator or directly the programming signals for the generator.

The solution here described refers also to a method for generating PRN codes operating with different navigation standards in a GNSS receiver performing the operation performed by the receiver described here above.

The solution here described refers also to a computer program product that can be loaded into the memory of at least one computer and comprises parts of software code that are able to execute the steps of the method described here above when the product is run on at least one computer.

BRIEF DESCRIPTION OF THE DRAWINGS

The invention will now be described purely by way of a non-limiting example with reference to the annexed drawings, in which.

DETAILED DESCRIPTION OF ILLUSTRATIVE EMBODIMENTS

Figure 1:
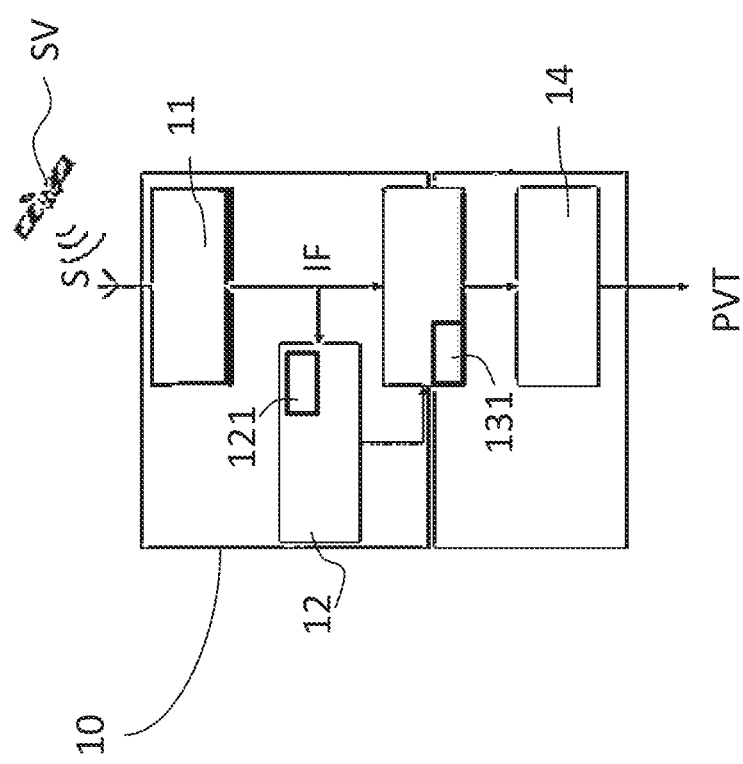
FIG. 1 schematically shows a satellite receiver.
Figure 2:
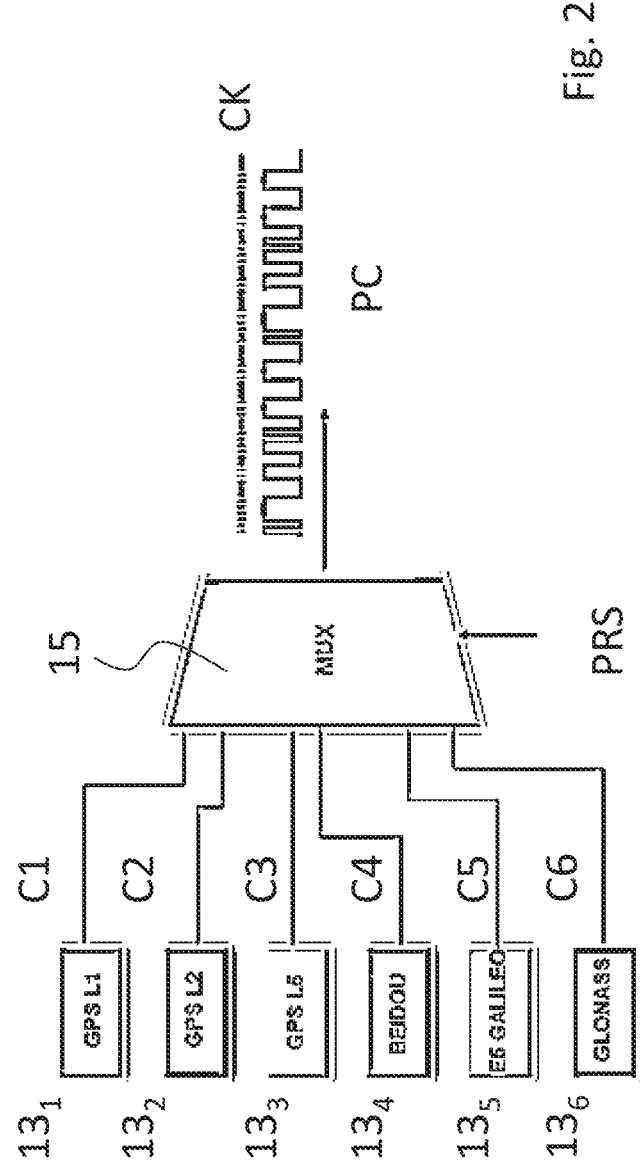
FIG. 2 shows a system that implements a separate PRN generator for each navigation system.

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

The present solution is based on the observation that among the different standard for GPS L1, GPS L2C, GPS L5, BEIDOU, GLONASS, GALILEO E5 the structure of their respective PRN generator for GPS L1, GPS L5, COMPASS, GALILEO E5 show a common structure with two generator/polynomial G1 and G2 (down). BEIDOU and GPS L2C standards have only one G1 generator of 9 and 27 taps respectively. Finally, the GLONASS PRN generator has just one 9 taps generator with a unique code that is spread on different carrier frequency. This is described in Table 1 here below.

TABLE 1

| SYSTEM | G1 Taps number | G2 Taps number | Presence of sum in the delay line |
|---|---|---|---|
| GPS | 10 | 10 | ANY |
| GLONASS | 9 | ANY | ANY |
| COMPASS | 11 | 11 | ANY |
| GALILEO E5 | 14 | 14 | ANY |
| GPS L5 | 13 | 13 | ANY |
| GPS L2C | 27 | ANY | YES |

The solution here described refers to a Pseudo-Random Noise code generator device comprising a first or upper linear register, formed by a respective chain of flip flops defining taps and a second or lower linear register with a respective, chain of taps, which can be concatenated one to the other to form a unique sequence of taps, concatenating meaning specifically connecting the output of the upper register, i.e. in particular the output of the last flip flop of the upper register with the input of the lower register, in particular the input of the first flip of the lower register, so that they form a unique linear register.

In particular the first and second register have the same number of taps, preferably 14 taps, so that when they are chained or concatenated a 28 taps chain is obtained to support the GPS L2C standard. The first and second register can be configured separately to obtain the remaining standards indicated in Table 1.

The structure of the PRN generator is automatically reconfigurable according to the system selected, for instance through a processor of the receiver that programs a selection parameter in order to encode the configurations.

Figure 3:
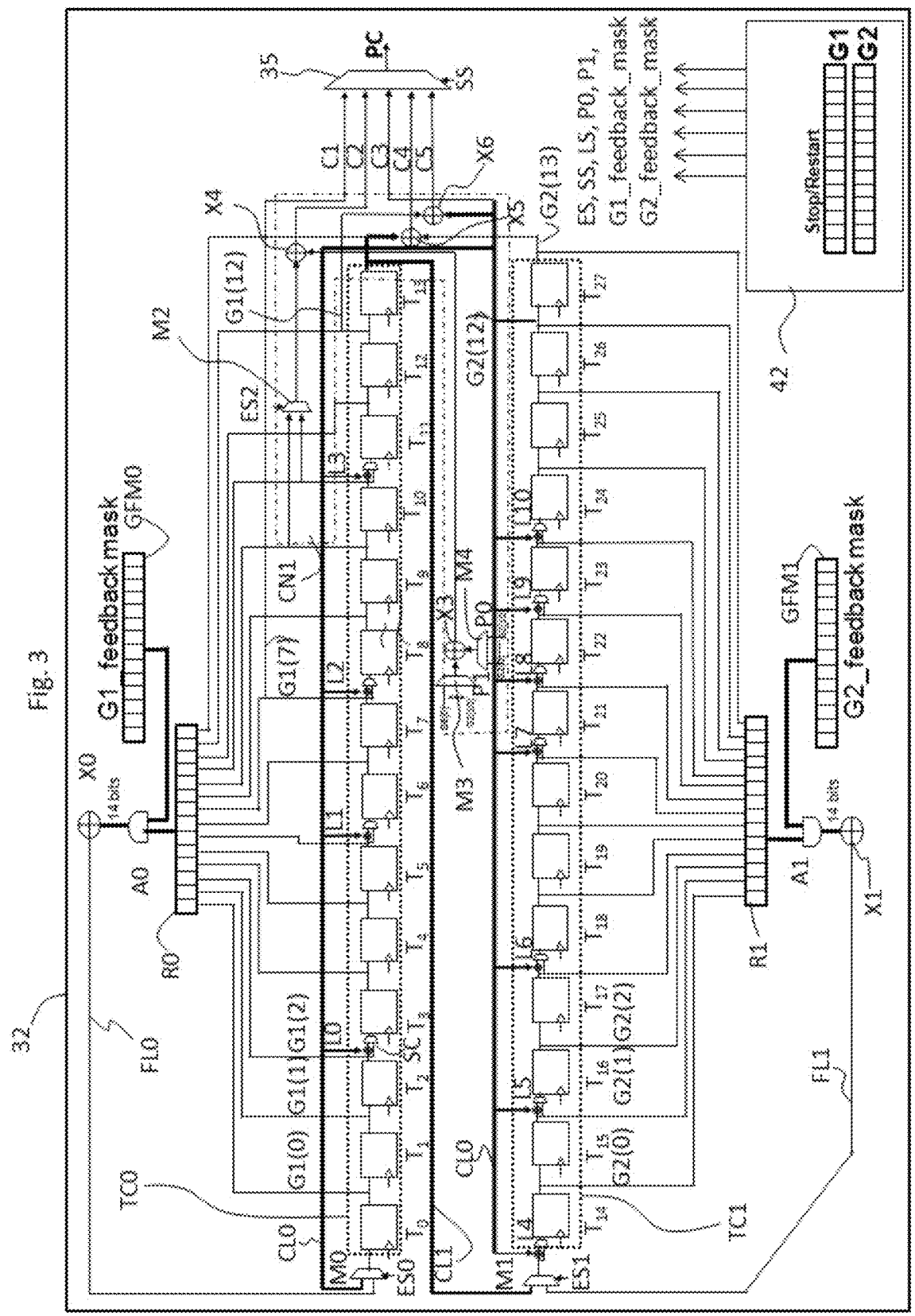
FIG. 3 represents schematically a first embodiment of the solution here described.

FIG. 3 it schematically shows a first embodiment of a PRN generator 32 according to the solution here described.

Such PRN generator 32 includes a first, upper, linear registers TC0, i.e. a shift register with fourteen flip-flops, $T_0 \ldots T_{13}$, the output of each of such flip-flops representing a tap at which the value there present, a tap signal $G1(0) \ldots G1(13)$ can be picked up.

At the input of the first flip-flop $T_0$ of the upper register TC0 is connected the output of an upper concatenation multiplexer M0, which is a two-input multiplexer, i.e., a switch.

The outputs, i.e., tap signals $G1(0) \ldots G1(13)$ of the flip-flops $T_0 \ldots T_{13}$ are concatenated to form an upper signal R0, thus forming a 14 bit word or sequence, which is the input of an upper AND logic gate A0. The other input of the logic AND gate A0 is represented by a mask G1_feedback mask, a bit sequence having also 14 bit, stored in an upper programming register GFM0. On the output of the upper AND gate A0, which has 14 bits, is performed a XOR operation in a block X0, which is an upper feedback XOR gate, obtaining a single bit as output, an upper feedback signal FL0 which is brought as input of the upper concatenation multiplexer M0, in particular in the example here described with reference to the Tables below, to the input of the upper concatenation multiplexer M0 selected by the '0' value of a concatenation selection signal ES0. Such concatenation selection signal ES0, as explained in the following, is provided by a logic module 42 programming the generator 32. On the input of flip-flops $T_3$, $T_6$, $T_8$, $T_{10}$ is provided a selector circuit SC, which is better detailed in FIG. 5.

Figure 5:
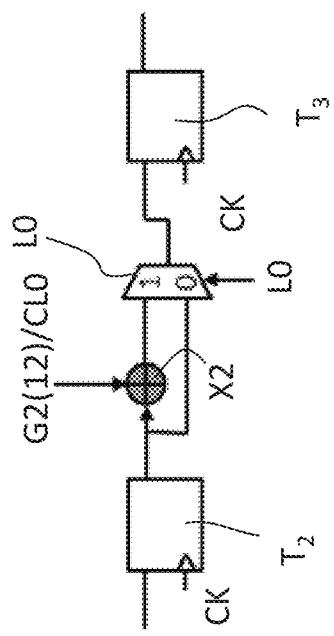
FIG. 5 represents schematically a detail of a circuit of the solution of FIG. 3.

FIG. 5 shows the selector circuit SC arranged between flip-flops $T_2$ and $T_3$. The signal clock CK clocking the flip-flops and the register is also shown here. The selector circuit SC, and the other selector circuits SC associated to input of flip flops, both in the upper register TC0 and in the lower register TC1, comprise a XOR gate X2 which receives the output value $G2(12)$ of flip flop $T_{26}$, $G2(12)$, which represents a lower concatenation signal CL0 as shown in the following. On the output of the previous flip-flop in the chain, in this case $G1(2)$ from $T_2$, is there performed a XOR in the XOR gate X2 with such output value of flip flop $T_{26}$, the corresponding result forming one input of a two-input standard selection multiplexer L0, the other being the direct output of the previous flip flop $T_2$.

The output of the standard selection multiplexer L0 forms the input of the next flip flop Tin the chain. In this way, by a standard selection signal LS is possible to select either the output of the previous flip flop, i.e. the shift register operates normally, or the results of the XOR operation between such output and the output of flip-flop $T_{26}$, i.e. tap $G2(12)$, which corresponds to the output of standard GPS L2C, which as mentioned, has 27 taps, and is a lower concatenation signal CL0 used when the upper register TC0 and the lower register TC1 are concatenated together. In Table 5 are indicated the values of the selection signal LS for each selection multiplexer L0 ... L10 to obtain a specific standard. Such output of flip-flop $T_{26}$, i.e. lower concatenation signal CL0, forms also the second input of the upper concatenation multiplexer M0, which indeed switches between such lower concatenation signal CL0, when the concatenated chain and standard GPS L2C is needed, and the upper feedback signal FL0, when PRN codes according to other navigation standards are requested.

The upper register TC0, as indicated, contains four selector circuit SC on the output of flip flops T2, T5, T7, T19, having a respective multiplexer L0, L1, L2, L3 commanded by selection signal LS.

The lower register TC1 is configured in the same way, a linear shift register formed by flip flops $T_{14}, \ldots T_{27}$.

At the input of the first flip-flop of the first register TC0 is connected the output of the upper concatenation multiplexer M0, while at the input of the first flip-flop, $T_{14}$, of the second register TC1 is connected the output of an analogous lower concatenation multiplexer M1.

The outputs of the flip-flops $T_{14}, \ldots T_{27}$ are concatenated to form a second lower signal R1, which is the input of a lower AND gate A1. The other input of the lower AND gate A1 is represented by a second mask G2_feedback mask, having also 14 bits, stored in a second programming register GFM1. On the output of the AND gate A1 is performed a XOR operation in block X1, which is a lower feedback XOR gate, obtaining a single bit as output, which corresponds to a lower feedback signal FL1 of the linear register TC1 brought as input of the lower concatenation multiplexer M1, in particular in the example here described with reference to the tables, to the input selected by the '0' selection signal ES1 of such multiplexer M1. On the input of flip flops $T_{14}$, $T_{16}$, $T_{18}$, $T_{21}$, $T_{22}$, $T_{23}$, $T_{24}$ it is provided an instance of the selector circuit SC, which multiplexer, L4 ... L10 respectively, is driven by the selection signal LS issued by the logic 42. The selector circuits SC are connected to the line carrying the a lower concatenation signal CL0, i.e. the value of output $G2(12)$ or output of flip-flop $T_{26}$, i.e. the penultimate flip-flop of the second register TC1, which forms also the second input of the upper concatenation multiplexer M0.

An upper concatenation signal CL1 is formed by the output of the upper register TC1, specifically by the output $G1(13)$ of the last flip-flop $T_{13}$, which is brought as input to the lower concatenation multiplexer M1 and to a XOR gate X5.

As it can be seen in Table 5, the upper multiplexer M0 is commanded to select the lower concatenation signal CL0 as input of the upper register TC1 when the GPS L2C standard is requested, while the upper concatenation signal CL1 is selected as input of the second register TC1 in the same time by the lower concatenation multiplexer M1. For the other standards the two register operate independently, i.e. the upper register M0 and the lower register M1 select the respective feedback signal FL0 and FL1 as input of the respective registers TC0 and TC1.

The circuit of generator 32 includes an output multiplexer 35 which selects one of five PRN code channels, C1 . . . C5 on the basis of a system selection signal SS issued by the logic 42. The first channel, C1, which corresponds to the standard GLONASS, is directly taken from the tap signal G1(7). The other PRN code channels C2 . . . C5 are enabled by channel enabling XOR gates forming a channel selection network CN1.

In particular a first enabling XOR gate X3 receives the output of lower multiplexer M3 and M4 which operates selection on G2(0) . . . G2(10) tap signals from the lower register TC1 under the control of auxiliary selection signals P1 and P0 respectively, representing a satellite PRN selection logic which allows to select a sum of two signals among G2(0) . . . G2(10) (see Table 8 and Table 9 below for the values taken by the auxiliary selection signals P0 and P1).

The output of the XOR gate X3 is brought to a second enabling XOR gate X4. The other input of the second enabling XOR gate X4 is the output of a switch multiplexer M2 which selects, under control of a selection signal ES2 between the output of flip-flop $T_{10}$ and the output of flip-flop $T_9$ to switch between GPS and Beidou standards. The output of the first enabling XOR gate X3 is the PRN code channel C2, which corresponds to the PRN code of GPS or Beidou.

A XOR gate X5 is also provided which performs a XOR on the output of flip-flop on the output of flip-flop $T_{13}$, i.e. the upper concatenation signal CL1, and $T_{27}$, to form a PRN code channel C4, corresponding to the Galileo E5 standard.

A XOR gate X6 performs a XOR operation on the output of flip-flop $T_{12}$ and $T_{26}$, i.e. lower concatenation signal CL0, to form a PRN code channel C5, corresponding to L5 standard.

The GLONASS channel C1 is obtained by taking the output of flip-flop $T_7$.

Thus, in general, the PRN code generator 32 includes channel selection network CN1 which includes a plurality of selection devices, in particular multiplexers M3, M4 to select signals of given taps of the upper and lower registers TC0, TC1 and combination operators, which are represented by a network of XOR operators X3, X4, X5 to combine the selected signals to form channels of PRN codes C2, . . . , C5 (C1 channel is directly taken by a tap of the upper register, although the line itself picking the signal can be considered also part of network CN1) to be selected by the output multiplexer 35 under the control of a selection system signal SS generated by an external processor 40.

According to the configuration parameter the structure of the PRN code generator 32 reconfigures itself automatically. The concatenation multiplexers M0 and M1 allow to implement the two polynomial generators, pertaining G1 and G2 sequence, enabling the registers TC0 and TC1 respectively (required in GPS L1, GPS L5, BEIDOU and GALILEO E5 standards) and the sole 27 taps polynomial generator, using both registers TC0 and TC1 concatenated as required by standard GPS L2C. The sequence of the taps, i.e. the flip-flop outputs, of the first register TC0, $T_0 \ldots T_{13}$ is called G1(0 . . . 13) while the sequence of the taps of the second register TC1, $T_{14}, \ldots T_{27}$ is called G2(0 . . . 13), as mentioned. On such taps G1(0 . . . 13) or G2(0 . . . 13) as mentioned above is performed a XOR operation (i.e. modulo2 sum), respectively by the upper feedback XOR gate X0 and lower feedback XOR gate X1, sent in XOR operator (i.e. modulo2 sum) with the masks G1_feedback_mask and G2_feedback_mask in the register GFM0 and GMF1 respectively to perform programming of the generator, i.e. select the required taps. For the GPS standard for instance the output of the flip-flop $T_2$ and flip-flop $T_9$ of the upper generator G1 must be present at the output of the upper feedback XOR gate X0 so G1_feedback_mask[13:0] must be programmed by control 42 to "00001000000100". Then, G2_feedback_mask[13:0] must be programmed to "00001110100110", in such way, as required by the standard, the second, third, sixth, eighth, ninth, tenth tap of the lower generator G2 (corresponding to flip flops $T_{15}$, $T_{16}$, $T_{19}$, $T_{21}$, $T_{22}$, $T_{23}$ in the solution here described) are sent through the lower feedback XOR gate X1.

With reference to FOG. 4, the GNSS PRN flexible generator 32 is arranged in a GNSS receiver such as receiver 10 of FIG. 1 which includes or is connected to a system processor 40 which is configured, for instance through its software, to access a register map 41. For each standard the register map 41 contain the corresponding system selection signal SS, the G1 and G2 sequence initial value to be initialized in registers TC0 and TC1 and the PRN code to be generated, which are used to program a control logic 42 of the PRN code generator 32.

Table 2 here below shows the values of the system selection signal SS (four bits, one in each column) in the register map 41 for each different navigation system SY, i.e. each different navigation standard, which values is supplied for instance as input by processor 40.

TABLE 2

| System Selection SS | | | | SYSTEM SY |
|---|---|---|---|---|
| 0 | 0 | 0 | 0 | GPS |
| 0 | 0 | 0 | 1 | BEIDOU |
| 0 | 0 | 1 | 0 | GLONASS |
| 0 | 0 | 1 | 1 | GPS L2 CM |
| 0 | 1 | 0 | 0 | GPS L2 CL |
| 0 | 1 | 0 | 1 | GPS L5 |
| 0 | 1 | 1 | 0 | GAL E5 A-I |
| 0 | 1 | 1 | 1 | GAL E5 A-Q |
| 1 | 0 | 0 | 0 | GAL E5 B-I |
| 1 | 0 | 0 | 1 | GAL E5 B-Q |

Table 3 here below shows the values of the G1G2_INITIAL_VALUE register configuration in the register map 41, which is arranged in a 32 bits register:

TABLE 3

| G1G2_INITIAL_VALUE | | | | |
|---|---|---|---|---|
| * | * | 14 bit G2 ($T_{27} \ldots T_{14}$) | * * | 14 bit G1 ($T_{13} \ldots T_0$) |

Table 4 here below shows the PRN CODE register configuration, also arranged in a respective 32 bits register:

TABLE 4

| PRN CODE |
|---|
| * * * * * * * * * * * * * * * * * * * * * * * * PRN code [7:0] |

The asterisk * means "do not care".

In the columns of Tables 2-4 above are indicated the basic configuration parameters: System Selection SS, initial value of the G1-G2 sequences (28 taps) and PRN code. In some system like GPS L1 and BEIDOU the PRN code is determined by the positions of the two feedback branches that are the outputs of the multiplexers M3 and M4 whose input are G2(0) . . . G2(9) from the lower register TC1 generating the sequence G2 entering in the XOR X3. In other systems like GPS L2C, GPS L5 and GALILEO E5 the PRN code is determined only by the initial value of the sequences G1 and G2 written into the G1G2_INITIAL_VALUE register, as also specified in the Tables 6-12 in the following.

The control logic 42, which can be a simple decoder, upon receiving such values, automatically generates the selection signals ES0, ES1, ES2 for multiplexers M0, M1, M2, the auxiliary selection signals P0, P1 for multiplexers M3, M4, the standard select signal LS for standard selection multiplexers L0 . . . L10, the G1_feedback_mask and G2_feedback_mask to be stored in the programming registers GFM0, GFM1, setting them to the proper values according to the system selected by the software in processor 40 and its relative standard. Table 5 below indicates the automatic multiplexer configuration for different standard systems, i.e. the correspondence in the unit 42, between the system selection SS issued by register map 41, in the first column, the corresponding system standard SY in second column, the signal ES0 of multiplexer M0, ES1 of multiplexer M1 and ES2 of multiplexer M2, in third, fourth, fifth column, and the signals LS0 . . . LS10 of selection multiplexers L0 . . . L10.

TABLE 5

| System Selection SS | | | | Standard SY | Mux M0 (ES0) | Mux M1 (ES1) | Mux M2 (ES2) | Mux L0 . . . L10 selection signal LS |
|---|---|---|---|---|---|---|---|---|
| 0 | 0 | 0 | 0 | GPS | 0 | 0 | 1 | 0 |
| 0 | 0 | 0 | 1 | BEIDOU | 0 | 0 | 0 | 0 |
| 0 | 0 | 1 | 0 | GLONASS | 0 | 0 | * | 0 |
| 0 | 0 | 1 | 1 | GPS L2 CM | 1 | 1 | * | 1 |
| 0 | 1 | 0 | 0 | GPS L2 CL | 1 | 1 | * | 1 |
| 0 | 1 | 0 | 1 | GPS L5 | 0 | 0 | * | 0 |
| 0 | 1 | 1 | 0 | GALILEO E5 A- I | 0 | 0 | * | 0 |
| 0 | 1 | 1 | 1 | GALILEO E5 A-Q | 0 | 0 | * | 0 |
| 1 | 0 | 0 | 0 | GALILEO E5 B- I | 0 | 0 | * | 0 |
| 1 | 0 | 0 | 1 | GALILEO E5 B-Q | 0 | 0 | * | 0 |

The asterisk * means "do not care."

In Table 6 here below is shown the G1 and G2 feedback mask automatic configuration for the different systems SY:

TABLE 6

| System Selection SS | | | | SYSTEM SY | G1_feedback_mask [13 . . . 0] | G2_feedback_mask [13 . . . 0] |
|---|---|---|---|---|---|---|
| 0 | 0 | 0 | 0 | GPS | 00001000000100 | 00001110100110 |
| 0 | 0 | 0 | 1 | BEIDOU | 00011111000001 | 00010110011111 |
| 0 | 0 | 1 | 0 | GLONASS | 00000100010000 | 00000000000000 |
| 0 | 0 | 1 | 1 | GPS L2 CM | * | * |
| 0 | 1 | 0 | 0 | GPS L2 CL | * | * |
| 0 | 1 | 0 | 1 | GPS L5 | 01101100000000 | 01100011101101 |
| 0 | 1 | 1 | 0 | GAL E5 A-I | 10000010100001 | 10100011011000 |
| 0 | 1 | 1 | 1 | GAL E5 A-Q | 10000010100001 | 10100011011000 |
| 1 | 0 | 0 | 0 | GAL E5 B-I | 11010000001000 | 10001100110001 |
| 1 | 0 | 0 | 1 | GAL E5 B-Q | 11010000001000 | 10001100110001 |

In Table 7 here below is shown how to program a prn code for the different system:

TABLE 7

| System Selection | | | | SYSTEM | G1G2_INITIAL_VALUE (hex) | PRN CODE |
|---|---|---|---|---|---|---|
| 0 | 0 | 0 | 0 | GPS | 03FF03FF | To program (table8) |
| 0 | 0 | 0 | 1 | BEIDOU | 02AA02AA | To program (table9) |
| 0 | 0 | 1 | 0 | GLONASS | 000001FF | * |
| 0 | 0 | 1 | 1 | GPS L2 CM | To program (Table10) | * |
| 0 | 1 | 0 | 0 | GPS L2 CL | To program (Table10) | * |
| 0 | 1 | 0 | 1 | GPS L5 | To program (Table12) | * |
| 0 | 1 | 1 | 0 | GAL E5 A-I | To program (Table11) | * |
| 0 | 1 | 1 | 1 | GAL E5 A-Q | To program (Table11) | * |
| 1 | 0 | 0 | 0 | GAL E5 B-I | To program (Table11) | * |
| 1 | 0 | 0 | 1 | GAL E5 B-Q | To program (Table11) | * |

In Table 8 here below is shown the PRN code to be programmed in the GPS mode:

TABLE 8

| PRN NUMBER (Satellite ID) | PRN code register value (hex) | Taps selected from G2 by bits 6 to 4 (MUX M4, P0) | by bits 3 to 0 (MUX M3, P1) |
|---|---|---|---|
| 1 | 62 | 6 | 2 |
| 2 | 73 | 7 | 3 |
| 3 | 04 | 8 | 4 |
| 4 | 15 | 9 | 5 |
| 5 | 11 | 9 | 1 |
| 6 | 22 | 10 | 2 |
| 7 | 01 | 8 | 1 |
| 8 | 12 | 9 | 2 |
| 9 | 23 | 10 | 3 |
| 10 | 32 | 3 | 2 |
| 11 | 43 | 4 | 3 |
| 12 | 65 | 6 | 5 |
| 13 | 76 | 7 | 6 |
| 14 | 07 | 8 | 7 |
| 15 | 18 | 9 | 8 |
| 16 | 29 | 10 | 9 |
| 17 | 41 | 4 | 1 |
| 18 | 52 | 5 | 2 |
| 19 | 63 | 6 | 3 |
| 20 | 74 | 7 | 4 |
| 21 | 05 | 8 | 5 |
| 22 | 16 | 9 | 6 |
| 23 | 31 | 3 | 1 |
| 24 | 64 | 6 | 4 |
| 25 | 75 | 7 | 5 |
| 26 | 06 | 8 | 6 |
| 27 | 17 | 9 | 7 |
| 28 | 28 | 10 | 8 |
| 29 | 61 | 6 | 1 |
| 30 | 72 | 7 | 2 |
| 31 | 03 | 8 | 3 |
| 32 | 14 | 9 | 4 |

In Table 9 here below is shown the PRN code to be programmed in the BEIDOU mode:

TABLE 9

| PRN NUMBER (Satellite ID) | PRN code register value (hex) | Taps selected from G2 by bits 7 to 4 (MUX M4, P0) | by bits 3 to 0 (MUX M3, P1) |
|---|---|---|---|
| 1 | 02 | 1 | 3 |
| 2 | 03 | 1 | 4 |
| 3 | 04 | 1 | 5 |
| 4 | 05 | 1 | 6 |
| 5 | 07 | 1 | 8 |
| 6 | 08 | 1 | 9 |
| 7 | 09 | 1 | 10 |
| 8 | 0A | 1 | 11 |
| 9 | 16 | 2 | 7 |
| 10 | 23 | 3 | 4 |
| 11 | 24 | 3 | 5 |
| 12 | 25 | 3 | 6 |
| 13 | 27 | 3 | 8 |
| 14 | 28 | 3 | 9 |
| 15 | 29 | 3 | 10 |
| 16 | 2A | 3 | 11 |
| 17 | 34 | 4 | 5 |
| 18 | 35 | 4 | 6 |
| 19 | 37 | 4 | 8 |
| 20 | 38 | 4 | 9 |
| 21 | 39 | 4 | 10 |
| 22 | 3A | 4 | 11 |
| 23 | 45 | 5 | 6 |
| 24 | 47 | 5 | 8 |
| 25 | 48 | 5 | 9 |
| 26 | 49 | 5 | 10 |
| 27 | 4A | 5 | 11 |
| 28 | 57 | 6 | 8 |
| 29 | 58 | 6 | 9 |
| 30 | 59 | 6 | 10 |
| 31 | 5A | 6 | 11 |
| 32 | 78 | 8 | 9 |
| 33 | 79 | 8 | 10 |
| 34 | 7A | 8 | 11 |
| 35 | 89 | 9 | 10 |
| 36 | 8A | 9 | 11 |
| 37 | 9A | 10 | 11 |

In Table 10 here below is shown the G1G2_INITIAL_VALUE value to be programmed in the GPS L2C mode:

TABLE 10

| PRN NUMBER | L2-CM | L2-CL |
|---|---|---|
| 1 | 05BF028F | 0BFA1853 |
| 2 | 170300EF | 09E106C5 |
| 3 | 04CE1E80 | 0E003C12 |
| 4 | 057A34D8 | 04460227 |
| 5 | 139C0303 | 14EC1900 |
| 6 | 1B752587 | 0D6C21A8 |
| 7 | 03810A54 | 0FA82AAB |
| 8 | 11E70DE3 | 1FF228C2 |
| 9 | 11381BC8 | 07EC3B60 |
| 10 | 0C8921B7 | 0F842B1D |
| 11 | 14C50BA7 | 155C3990 |
| 12 | 0C3F2250 | 02973FE4 |
| 13 | 18023510 | 16E70AC3 |
| 14 | 12EB1632 | 18EF2180 |
| 15 | 00130D00 | 15DB0AC8 |
| 16 | 0C582092 | 11390B3B |
| 17 | 0D02340D | 01240343 |
| 18 | 14782B42 | 1C273A80 |
| 19 | 04C42058 | 129C3955 |
| 20 | 07A83814 | 15FE2ADA |
| 21 | 1B5C2048 | 18703EC0 |
| 22 | 1D621E57 | 0ED33305 |
| 23 | 1FDC1F48 | 189E1F8F |
| 24 | 01B8050F | 0D732B63 |
| 25 | 07433407 | 0118279F |
| 26 | 11AE1420 | 079E2E17 |
| 27 | 149D23A7 | 18882A07 |
| 28 | 09C22DF7 | 19AE3A92 |
| 29 | 071E2726 | 046A3EB4 |
| 30 | 1C051227 | 14A52CCF |
| 31 | 1B443297 | 0D900084 |
| 32 | 1A253828 | 0E79256A |
| 33 | 187D1605 | 107837F1 |
| 34 | 0F1F316F | 086E11E7 |
| 35 | 11EF0EF4 | 1C230692 |
| 36 | 1A9B36EF | 1C6C291D |
| 37 | 0A460B71 | 1B8D0E0A |

In Table 11 here below is shown the value G1G2_INITIAL_VALUE to be programmed in the GALILEO E5 mode:

TABLE 11

| PRN NUMBER | E5A-I | E5A-Q | E5B-I | E5B-Q |
|---|---|---|---|---|
| 1 | 30C53FFF | 2BAA3FFF | 0E903FFF | 06D93FFF |
| 2 | 189C3FFF | 0A623FFF | 2C273FFF | 0C633FFF |
| 3 | 2E8B3FFF | 29D33FFF | 00AA3FFF | 2AD23FFF |

TABLE 11-continued

| PRN NUMBER | E5A-I | E5A-Q | E5B-I | E5B-Q |
|---|---|---|---|---|
| 4 | 217F3FFF | 33E93FFF | 1E763FFF | 26F93FFF |
| 5 | 26CA3FFF | 2EF63FFF | 18713FFF | 010B3FFF |
| 6 | 37333FFF | 29B03FFF | 05603FFF | 3C9D3FFF |
| 7 | 1B8C3FFF | 37AD3FFF | 035F3FFF | 1FE83FFF |
| 8 | 155F3FFF | 2F283FFF | 2C133FFF | 09E53FFF |
| 9 | 03573FFF | 0F963FFF | 03D53FFF | 16053FFF |
| 10 | 309E3FFF | 03C53FFF | 219F3FFF | 3E603FFF |
| 11 | 2EE43FFF | 15CF3FFF | 04F43FFF | 306D3FFF |
| 12 | 0EBA3FFF | 34523FFF | 2FD93FFF | 209F3FFF |
| 13 | 3CFF3FFF | 1C3D3FFF | 31A03FFF | 07313FFF |
| 14 | 1E263FFF | 1DA43FFF | 387C3FFF | 33B23FFF |
| 15 | 0D1C3FFF | 3F6E3FFF | 0D343FFF | 2E663FFF |
| 16 | 1B053FFF | 053F3FFF | 0FBE3FFF | 0B673FFF |
| 17 | 28AA3FFF | 04B53FFF | 34993FFF | 052E3FFF |
| 18 | 13993FFF | 0D183FFF | 10EB3FFF | 300B3FFF |
| 19 | 29FE3FFF | 2A263FFF | 01ED3FFF | 00D23FFF |
| 20 | 01983FFF | 15DD3FFF | 2C3F3FFF | 11F13FFF |
| 21 | 13703FFF | 08B23FFF | 13A43FFF | 2DF73FFF |
| 22 | 1EBA3FFF | 12983FFF | 135F3FFF | 3C043FFF |
| 23 | 2F253FFF | 001F3FFF | 3A4D3FFF | 31CB3FFF |
| 24 | 33C23FFF | 0C5F3FFF | 212A3FFF | 0FB23FFF |
| 25 | 160A3FFF | 08CA3FFF | 39A53FFF | 23883FFF |
| 26 | 19013FFF | 21863FFF | 2BB43FFF | 205C3FFF |
| 27 | 39D73FFF | 12723FFF | 23033FFF | 12B23FFF |
| 28 | 25973FFF | 24AA3FFF | 34AB3FFF | 11C63FFF |
| 29 | 31933FFF | 315B3FFF | 04DF3FFF | 38633FFF |
| 30 | 2EAE3FFF | 298C3FFF | 31FF3FFF | 12293FFF |
| 31 | 03503FFF | 0FF73FFF | 2E523FFF | 2B303FFF |
| 32 | 18893FFF | 35C53FFF | 24FF3FFF | 1FB53FFF |
| 33 | 33353FFF | 0A2A3FFF | 3C7D3FFF | 34EC3FFF |
| 34 | 24743FFF | 2F6B3FFF | 363D3FFF | 22983FFF |
| 35 | 374E3FFF | 07C93FFF | 36693FFF | 20663FFF |
| 36 | 05DF3FFF | 04213FFF | 165C3FFF | 12F23FFF |
| 37 | 22CE3FFF | 39FD3FFF | 0F1B3FFF | 3EA63FFF |
| 38 | 3B153FFF | 0ABC3FFF | 108E3FFF | 10E43FFF |
| 39 | 3B9B3FFF | 3EEE3FFF | 3B363FFF | 1A1C3FFF |
| 40 | 29AD3FFF | 1C853FFF | 055B3FFF | 2B393FFF |
| 41 | 182C3FFF | 3CB83FFF | 0AE93FFF | 2BA63FFF |
| 42 | 2E173FFF | 0D803FFF | 30513FFF | 246F3FFF |
| 43 | 0D843FFF | 2DFB3FFF | 18083FFF | 08DE3FFF |
| 44 | 332D3FFF | 1EFD3FFF | 357E3FFF | 1CEE3FFF |
| 45 | 39353FFF | 3AB73FFF | 30D63FFF | 083D3FFF |
| 46 | 2ABB3FFF | 3CAD3FFF | 3F1B3FFF | 05963FFF |
| 47 | 21F33FFF | 14243FFF | 2C123FFF | 13C63FFF |
| 48 | 33D13FFF | 2D223FFF | 3BF83FFF | 3E093FFF |
| 49 | 1ECA3FFF | 23913FFF | 0DB83FFF | 2E213FFF |
| 50 | 16BF3FFF | 2B093FFF | 140F3FFF | 32143FFF |

In Table 12 here below is shown the value G1G2_INITIAL_VALUE to be programmed in the GPS L5 mode:

TABLE 12

| PRN NUMB | L5-XBI | L5-XBQ |
|---|---|---|
| 1 | 04EA1FFF | 06691FFF |
| 2 | 15831FFF | 0DE21FFF |
| 3 | 02021FFF | 188F1FFF |
| 4 | 0C8D1FFF | 0ADC1FFF |
| 5 | 1D771FFF | 09BC1FFF |
| 6 | 0BE61FFF | 12AA1FFF |
| 7 | 1F251FFF | 103F1FFF |
| 8 | 4BD1FFF | 02D61FFF |
| 9 | 1A9F1FFF | 185D1FFF |
| 10 | 0F7E1FFF | 0C241FFF |
| 11 | 0B901FFF | 14081FFF |
| 12 | 13E71FFF | 146A1FFF |
| 13 | 07381FFF | 14B21FFF |
| 14 | 1C821FFF | 1F851FFF |
| 15 | 0B561FFF | 1E3D1FFF |
| 16 | 12781FFF | 1F4B1FFF |
| 17 | 1E321FFF | 02671FFF |
| 18 | 0F0F1FFF | 04ED1FFF |
| 19 | 1F131FFF | 1B4C1FFF |
| 20 | 16D61FFF | 11C31FFF |
| 21 | 02041FFF | 01361FFF |
| 22 | 1EF71FFF | 0E341FFF |
| 23 | 0FE11FFF | 17D11FFF |
| 24 | 05A31FFF | 19F61FFF |
| 25 | 16CB1FFF | 1B221FFF |
| 26 | 0D351FFF | 07AA1FFF |
| 27 | 0F6A1FFF | 0BE11FFF |
| 28 | 0D5E1FFF | 085F1FFF |
| 29 | 10FA1FFF | 048A1FFF |
| 30 | 1DA11FFF | 13C11FFF |
| 31 | 0F281FFF | 14FA1FFF |
| 32 | 13A01FFF | 0A891FFF |
| 33 | 102B1FFF | 044D1FFF |
| 34 | 13FB1FFF | 044F1FFF |
| 35 | 076F1FFF | 19A61FFF |
| 36 | 02691FFF | 1EBC1FFF |
| 37 | 012C1FFF | 11641FFF |

The solution described is efficient in terms of silicon area compared to the standard solutions. As explained previously, the number of tracking channels in a GNSS receiver that needs to support a single PRN generator is highly increased, up to 128 or more channels. Comparing the number of taps, i.e. flip-flop circuits, required by the standard implementation and by the solution here described as function of the number of tracking channels Ntrk is obtained:

Number of flip-flop circuits in the standard solution=Ntrk*(GPS+COMPASS+GLONASS+ L5+E5+L2C)=Ntrk*(2*10+2*11+9+2*13+2*14+ 27)=132*Ntrk;

Number of flip flop with the proposed solution=28*Ntrk.

Although some extra logic is needed to manage the automatic configuration, a silicon area reduction is obtained (about 78%).

It is underlined that in FIG. 3 is shown a preferred solution in which the receiver includes a generator which 32 which includes a first register TC0 with a determined number of taps, namely fourteen, and a second register TC1 with a same number of taps. While this solution with symmetric sequences of taps is advantageous, allowing covering all the five named standard to be covered by a single generator using two registers of the same length, of course other solution may be possible where the generator includes a first register with a first number of taps and a second register with second number of taps, which can be also different, for instance if one of the standard is renounced.

Figure 6:
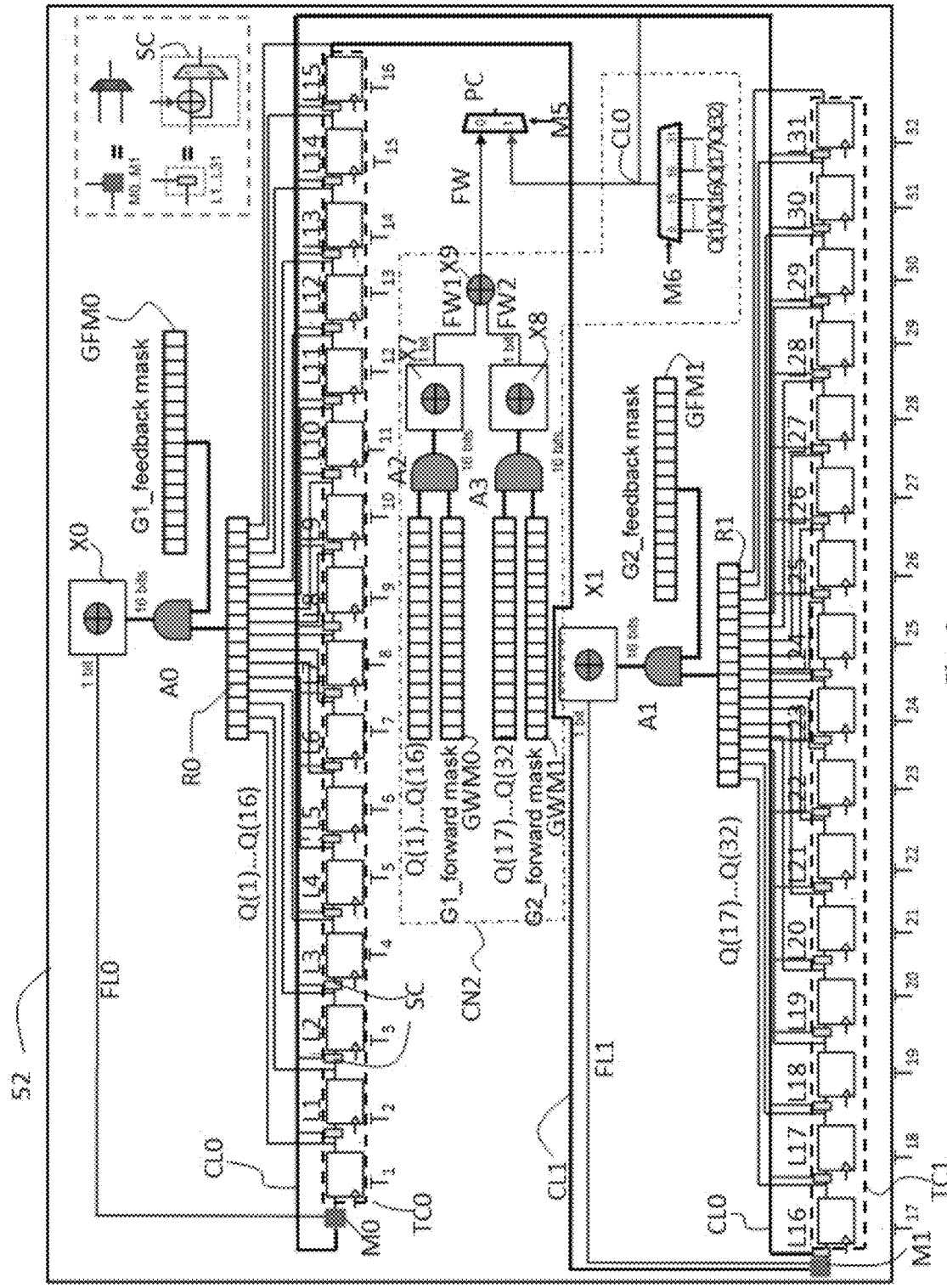
FIG. 6 represents schematically a second embodiment of the solution here described.

With a few hardware is possible to implement a more generic structure with two chain of 16 taps as shown in FIG. 6 which shown a second embodiment 52 of the PRN generator here described. In this generalized solution some extra logic is added to make it much more configurable and increase the possibility to support new navigation standard that could be developed while the device (GNSS receiver) has already been implemented.

The structure is similar to that of generator 32, with two register with chains of taps, upper register TC0 and lower TC1, The upper chain TC0 and lower chain TC1 however include in this case 16 taps, $T_1, \ldots T_{16}$ and $T_{17}, \ldots T_{32}$ respectively. In this second embodiment signals, taps and flip-flops are numbered starting from index 1 instead than starting from 0 like in the embodiment of FIG. 3.

The taps of each chain, which signals are indicated here respectively with Q(1) ... Q(16) and Q(17) ... Q(32), are also in this case brought to a respective AND gate A0, A1 together with feedback masks from registers GFM0, GFM1, the result being then XORed in a feedback XOR gate A0, A1 to produce a feedback signal FL0, FL1 for the concatenation multiplexers M0, M1.

To simplify the description of the embodiment 52 of FIG. 6 the selection signal of the output of multiplexers M0, M1, M5, M6 are indicated also in Tables 13 and 14 below, by the same references M0, M1, M5, M6. The multiplexer M2, M3 and M4 are not present in the embodiment of FIG. 6 because they are replaced with a more generic implementation according to the value of the forward masks G1_forward_mask and G2_forward_mask.

The concatenation multiplexers M0, M1 receive also a concatenation signal together with a feedback signal FL0, FL1. However the lower concatenation multiplexer M1 receives a first, upper, concatenation signal CL1 taken from the last tap, Q(16) from flip-flop $T_{16}$, of the first register TC0, as in the case of FIG. 3. A second, lower, concatenation signal CL0 for one of the inputs of the upper multiplexer M0 is instead taken from a multiplexer M6 which performs a selection among the tap signals Q(1) ... Q(16), Q(17) ... Q(32) originated by the taps of the upper and lower register, TC0, TC1, under the control of corresponding selection signals issued by the processor 40 (see for instance Table 14 which indicates selection signal M6).

In this case the content of upper signal R0 or lower signal R1, i.e. tap signal Q(1) ... Q(16) or Q(17) ... Q(32) respectively, is also brought to a respective second AND gate, A2 or A3, together with a respective G1_forward_mask or G2_forward_mask from respective forward registers GWM0, GWM1. The 16-bit result at the output of each AND gate is XORed in a respective forward XOR gate X7, X8, similarly to what is performed in feedback XOR gates X0, X1, obtaining a single bit forward signal FW1, FW2 from each XOR gate X7, X8. Between the two upper and lower forward signal FW1, FW2 is performed a further XOR operation by a XOR gate X9, obtaining a forward signal FW sent to one of the output of two-inputs output multiplexer M5 supplying as output the PRN code PC.

The other input of the output multiplexer M5 is represented by the output of the tap selection multiplexer M6 which receives as inputs the tap signals Q1 ... Q16 and Q17 ... Q32 and perform its selection under the control of a selection signal issued by processor 40.

This structure above, i.e. a channel selection network CN2, including basically the forward programming signal calculation gates, A2, A3, X7, X8, X9 and the multiplexer M3 substantially replaces the channel selection network CM represented by multiplexer M2 and selection XOR X3, X4, X5 of the first embodiment of FIG. 3.

Thus, the channel selection network CN2 in this case includes a circuit for selecting the tap signals Q(1) ... Q(32) of the first and second register TC0, TC1 by a respective forward mask, G1_forward_mask or G2_forward_mask, and to combine the selected signals of one register with the selected signals with the other to obtain an input signal, forward signal FW for the output multiplexer M5, the second input of which corresponds to the second concatenation signal CL1 taken from a multiplexer M3 selecting among the signals Q1 ... Q31 originated by taps of the first and second register, to be selected by the output multiplexer M5 under the control of a selection system signal generated by an external processor 40.

Figure 4:
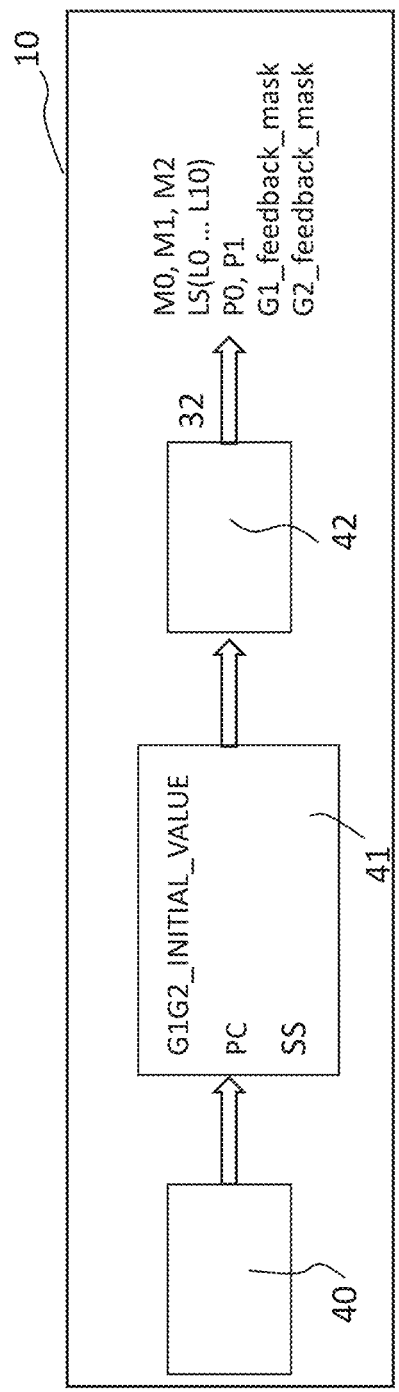
FIG. 4 represents schematically a control module operating with the embodiment of FIG. 3.

Another feature of this second embodiment 52 is that a selector circuit SC like in FIG. 4 is interposed in this case between each pair of flip flops, i.e. after each output Q1 ... Q31. Only at the output of the final flip-flop $T_{32}$ there is no selector circuit SC. There are therefore 31 multiplexers L1 ... L31, which receive corresponding selection signals. In this case the lower concatenation signal CL1 brought to the XOR gates XS of selector circuits SC is the output of the tap selection multiplexer M6.

Thus, to have a high re-configuration level versus future standard, the number of taps per chain in the second embodiment 52 is increased to 16 and there is the possibility to program which outputs tap to be sent in XOR to evaluate the PRN output (G1_feedback_mask and G2_feedback_mask).

In this case the software 40 through the register map 41 has to program directly, without passing through the control logic 42, the feedback masks G1_feedback_mask, G2_feedback_mask, the forward masks G1_forward_mask, a G2_forward_mask, the G1G2_INITIAL_VALUE, the M0, M1 selection signals, the L1 ... L31 multiplexer selection signals. Now the system SY and PRN code are identified by the value of the parameters.

In Table 13 here below is shown the G1G2_INITIAL_VALUE register configuration for the generator 52 of FIG. 7:

TABLE 13

| G1G2_INITIAL_VALUE (arranged in a 32 bits register) | |
| --- | --- |
| 16 bit G2 (tap32 ... tap17) | 16 bit G1 (tap16 ... tap1) |

As a first example, in order to program the PRN code relative to Satellite number 1 as indicated in GPS L1 standard, the parameters G1_feedback_mask, G2_feedback_mask, G1G2_initial_value are set according to similar criteria to those already set out for the embodiment 32 of FIG. 3. Since the number of taps is 16, however two '0' must be added on the left. The main difference is that they are now set by the software of processor 40 and not automatically set by the hardware control logic 42.

The parameters G1_forward_mask, G2_forward_mask, G1G2_initial_value must be set according to the PRN generator to be implemented, i.e. according to the system SY. For system GPS L1, looking at the standard, it is possible to see that the output is the XOR operation on the output of the tap 10, i.e. G1(10), of the generator G1 and two output of the generator G2 that identifies the PRN code. Referring to GPS PRN code satellites, the signal to be sent in XOR are: tap 10 of generator G1, tap 6 and tap 2 of generator G2, which are tap 22 and tap 18 in the implementation of FIG. 6. Thus, to select these outputs the mask G1_forward_mask must be set at "0000001000000000" value and G2_forward_mask must be set at "0000000000100010" value. Multiplexers M0, M1 must be set at 0, i.e. no concatenation, multiplexer M6 is thus unimportant, multiplexers L1 ... L31 must be also set at 0.

In Table 14 below an example of parameters configuration is supplied.

TABLE 14

| | G1_feedback_mask [15...0] | G2_feedback_mask [15...0] | G1_forward_mask [15...0] | G2_forward_mask [15...0] | G1G2_initial_value [31...0] (hex) |
|---|---|---|---|---|---|
| GPS SAT1 | 0000001000000100 | 0000001110100110 | 0000001000000000 | 0000000000100010 | 03FF03FF |
| L2 CM SAT1 | * | * | * | * | 016FC28F |
| GLONASS SAT1 | 0000000100010000 | * | 0000000010000000 | 0000000000000000 | 000001FF |

| | M0 | M1 | M6 | L1...L31 |
|---|---|---|---|---|
| GPS SAT1 | 0 | 0 | * | All '0' |
| L2 CM SAT1 | 1 | 1 | 11010 (26) | L3,L6,L8,L11,L14,L16,L18, L21,L22,L23,L24 at '1' |
| GLONASS | 0 | 0 | * | All '0' |

As second example it is considered how to program the GPS L2 CM PRN code relative to Satellite number 1 as indicated by the standard. GPS L2C requires a PRN generator with 27 taps. It is needed to configure a chain of 27 taps and mod-2 sum module, i.e. XOR, in the delay line. Looking at the L2C standard (Table 3-II. IS-GPS-200), the octal initial shift register value is '742417664'. This value must be converted in binary and then reversed to "001011011111100000101000111" to obtain the right programming order as initial value for taps 27 to 1. Adding 5 zeroes and converting to hexadecimal the value to be written in G1G2_initial_value is 016FC28F. Multiplexers M0, M1 must be set at '1', to concatenate registers TC0 and TC1, multiplexer M6 at "11010" (which corresponds to 26 i.e. tap 27 is selected by multiplexer M6, since in the control signal M6 it is counted from zero), multiplexers L3,L6,L8,L11, L14,L16,L18,L21,L22,L23,L24 must be set at '1'.

As third example it is considered how to program the GLONASS code. GLONASS code has a PRN code generator with 9 taps. The initial value of the GLONASS 9 taps shift register is "111111111" so the G1G2_initial_value[8 . . . 0] must be set all logic '1'. Tap 5 and tap 9 output must be sent in XOR while the PRN output is the output of tap 8. Thus, G1_forward_mask must be set at "00000000100000000" and G2_forward_mask must be set at "000000010000100000". Multiplexers M0, M1 must be set at 0 to hinder concatenation, multiplexer M6 is unimportant, multiplexer L1 . . . L31 must be set at '0'. Finally, G1_forward_mask must be set at "0000000000000000" to not affect the code generation (only the upper generator must work).

In particular this second embodiment is able to support three important family of PRN code generator:
all possible PRN code generators structured with one polynomial generator up to 16 taps (for example GLONASS is included);
all possible PRN code generator structured with two polynomial generator up to 16 taps (for example the current GPS L1-BEIDOU-GPS L1-GALILEO E5 are included);
all possible PRN code generator structured with one polynomial generator with sum in the delay line (for example L2C is included) up to 32 taps.

The solution according to the various embodiments here described allows to obtain the following advantages.

This solution advantageously provides that the optimization of area consumption on the chip.

This solution advantageously is also reconfigurable to support new standard after implementation on silicon.

Of course, without prejudice to the principle of the embodiments, the details of construction and the embodiments may vary widely with respect to what has been described and illustrated herein purely by way of example, without thereby departing from the scope of the present embodiments, as defined the ensuing claims.

What is claimed is:

1. A Pseudo-Random Noise code generator configured to generate PRN codes operating with different navigation standards for use with a GNSS receiver, the generator comprising:
a plurality of linear shift registers including a respective plurality of feedback taps;
a channel selection network including an output multiplexer;
a first register with a first number of taps and a second register with second number of taps, the first register and second register being associated to a respective feedback network to combine signals at the feedback taps to obtain a feedback signal that is selectably fed back through a selection circuit at an input of the respective register; and
a network to selectably concatenate the first register with the second register.

2. The generator according to claim 1, wherein the first register and the second register have the same number of taps.

3. The generator according to claim 1, wherein the network to selectably concatenate the first register with the second register is configured to generate concatenation signals, including a first concatenation signal from at least a tap of the first register to an input of the selection circuit at an input of the second register, and a second concatenation signal from at least a tap of the second register or of the first register to an input of the selection circuit at an input of the first register.

4. The generator according to claim 3, wherein the selection circuit is arranged to select an input of each register and configured to select the input between the feedback signal and the respective concatenation signal.

5. The generator according to claim 4, wherein the feedback network includes a register for storing a feedback mask to select the feedback taps forming the feedback signal.

6. The generator according to claim 1, wherein a selector circuit is arranged on one or more taps forming output of flip-flops of each register, the selector circuit also connected to a concatenation signal, wherein the selector circuit is configured to select between a tap signal and a combination between the tap signal and a second concatenation signal.

7. The generator according to claim 6, wherein the combination between the tap signal and the second concatenation signal is performed using an XOR operation.

8. The generator according to claim 1, wherein the channel selection network includes a plurality of selection devices including a multiplexer to select signals of given taps of the registers and an XOR operator to combine the selected signals to form channels of PRN codes to be selected by the output multiplexer under control of a selection system signal generated by an external processor.

9. The generator according to claim 8, wherein the number of taps of the first register is fourteen and the number of taps of the second register is fourteen, wherein the network to selectably concatenate the first register with the second register is configured to generate first and second concatenation signals, and wherein the first concatenation signal is taken from the last tap of the first register and the second concatenation signal is taken from a penultimate tap of the second register.

10. The generator according to claim 1, wherein the network to selectably concatenate the first register with the second register is configured to generate first and second concatenation signals.

11. The generator according to claim 10, wherein the channel selection network includes a circuit configured to select tap signals of first and second of the registers by a respective forward mask and to combine the selected signals of one register with the selected signals of the other to obtain an input signal for the output multiplexer, a second input corresponding to the second concatenation signal taken from a multiplexer selecting among the signals originated by taps of the first and second register, to be selected by the output multiplexer under control of a selection system signal generated by an external processor.

12. The generator according to claim 11, wherein the first and second registers include sixteen taps, and wherein the first concatenation signal is taken from the last tap of the first register while the second concatenation signal is taken from a multiplexer selecting among the signals originated by taps of the first and second register.

13. The generator according to claim 1, wherein the receiver includes a processor configured to access a register map containing initial values of the registers and masks and a PRN code to be generated, the register map containing a system select information to generate programming signals through a dedicated logic circuit for the generator or directly the programming signals for the generator.

14. A GNSS receiver comprising the generator according to claim 1.

15. A method for generating Pseudo-Random Noise codes operating with different navigation standards in a GNSS receiver, the method being performed using the generator according to claim 1.

16. A Pseudo-Random Noise code generator configured to generate PRN codes operating with different navigation standards for use with a GNSS receiver, the generator comprising:
 a plurality of linear shift registers including a respective plurality of feedback taps;
 a channel selection network including an output multiplexer;
 a first register with a first number of taps and a second register with second number of taps, the first register and second register being associated to a respective feedback network to combine signals at the feedback taps to obtain a feedback signal that is selectably fed back through a selection circuit at an input of the respective register; and
 a network to selectably concatenate the first register with the second register, the network to selectably concatenate the first register with the second register being configured to generate concatenation signals, including a first concatenation signal and a second concatenation signal.

17. The generator according to claim 16, wherein the selection circuit is arranged to select an input of each register and is configured to select the input between the feedback signal and the respective concatenation signal.

18. The generator according to claim 17, wherein the feedback network includes a register for storing a feedback mask to select the feedback taps forming the feedback signal.

19. The generator according to claim 16, wherein the channel selection network includes a circuit configured to select tap signals of first and second of the registers by a respective forward mask and to combine the selected signals of one register with the selected signals of the other to obtain an input signal for the output multiplexer, a second input corresponding to the second concatenation signal taken from a multiplexer selecting among the signals originated by taps of the first and second register, to be selected by the output multiplexer under control of a selection system signal generated by an external processor.

20. A Pseudo-Random Noise code generator module configured to generate PRN codes operating with different navigation standards for use with a GNSS receiver, the generator comprising:
 a plurality of linear shift registers including a respective plurality of feedback taps;
 a channel selection network including an output multiplexer;
 a first register and a second register having the same number of taps, the first register and second register being associated to a respective feedback network to combine signals at the feedback taps to obtain a feedback signal that is selectably fed back through a selection circuit at an input of the respective register;
 a network to selectably concatenate the first register with the second register, the network to selectably concatenate the first register with the second register being configured to generate concatenation signals, including a first concatenation signal and a second concatenation signal; and
 a selector circuit arranged on one or more taps forming output of flip-flops of each register, the selector circuit also connected to a concatenation signal generated by the network, wherein the selector circuit is configured to select between a tap signal and an XOR combination between the tap signal and the second concatenation signal.

* * * * *